United States Patent
Kim et al.

(10) Patent No.: US 9,703,867 B2
(45) Date of Patent: Jul. 11, 2017

(54) APPARATUS AND METHOD FOR DISPLAYING THUMBNAILS

(75) Inventors: Suk-Soon Kim, Suwon-si (KR); Jin-Young Jeon, Seoul (KR); Bum-Taek Lim, Yongin-si (KR); Young-Seop Han, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1111 days.

(21) Appl. No.: 12/199,511

(22) Filed: Aug. 27, 2008

(65) Prior Publication Data
US 2009/0070677 A1   Mar. 12, 2009

(30) Foreign Application Priority Data
Aug. 27, 2007 (KR) .......................... 10-2007-0086100

(51) Int. Cl.
G06F 3/048 (2013.01)
G06F 17/30 (2006.01)

(52) U.S. Cl.
CPC .............................. G06F 17/30849 (2013.01)

(58) Field of Classification Search
CPC ... A63F 2300/69; H04L 67/38; H04L 67/306; H04L 67/42; G06T 2207/10016
See application file for complete search history.

(56) References Cited

U.S. PATENT DOCUMENTS

| 7,251,790 B1 | 7/2007 | Drucker et al. |
| 2003/0090504 A1 | 5/2003 | Brook et al. |

(Continued)

FOREIGN PATENT DOCUMENTS

| EP | 1 024 444 | 1/2000 |
| KR | 1020060111853 | 10/2006 |

(Continued)

OTHER PUBLICATIONS

Holthe et al., Video Browsing Techniques for Web Interfaces, 2005 IEEE.

(Continued)

*Primary Examiner* — Jeffrey A Gaffin
*Assistant Examiner* — Ayesha Huertas Torres
(74) *Attorney, Agent, or Firm* — The Farrell Law Firm, P.C.

(57) ABSTRACT

An apparatus and method enabling a user to easily confirm a moving image. An apparatus for displaying thumbnails displays moving image clips in the form of thumbnails, and automatically plays a moving image corresponding to the thumbnail, on which an indicator is positioned, in accordance with a shift of the indicator. Also, if a key for adjusting the number of thumbnails displayed on a screen is input, the number of thumbnails displayed and the arrangement of the thumbnails are adjusted in accordance with the input of the adjustment key. In this case, a playback of the moving image corresponding to the thumbnail on which the indicator is positioned is maintained without interruption, and only the arrangement of the remaining thumbnail is changed. As described above, since the moving image is directly played, a user can easily search for and play a desired moving image, and can adjust the number of thumbnails displayed using a key for adjusting the number of thumbnails displayed on the screen, thereby providing convenience in operation to the user.

14 Claims, 5 Drawing Sheets

(56) References Cited

U.S. PATENT DOCUMENTS

| | | |
|---|---|---|
| 2004/0128317 A1 | 7/2004 | Sull et al. |
| 2006/0048184 A1 | 3/2006 | Poslinski et al. |
| 2006/0250419 A1 | 11/2006 | Shiba et al. |
| 2007/0071405 A1* | 3/2007 | Choi ................. H04L 69/22 386/239 |
| 2007/0189720 A1* | 8/2007 | Nakamura ........... G11B 19/025 386/230 |
| 2007/0294621 A1* | 12/2007 | Hansen et al. ................. 715/716 |
| 2008/0148152 A1* | 6/2008 | Blinnikka et al. ............. 715/719 |
| 2008/0159799 A1* | 7/2008 | Bender et al. ................. 400/472 |
| 2009/0030991 A1* | 1/2009 | Vakkalanka .................. 709/206 |

FOREIGN PATENT DOCUMENTS

| | | |
|---|---|---|
| KR | 1020070010331 | 1/2007 |
| KR | 1020070028998 | 3/2007 |
| KR | 1020070035724 | 4/2007 |

OTHER PUBLICATIONS

Korean Office Action dated Oct. 23, 2013 issued in counterpart application No. 10-2007-0086100, 6 pages.

Ole-Ivar Holthe et al., "Video Browsing Techniques for Web Interfaces", IEEE Consumer Communications and Networking Conference, Jan. 8, 2006, 5 pages.

European Search Report dated Feb. 1, 2016 issued in counterpart application No. 15186092.1-1951, 10 pages.

* cited by examiner

FIG.5A    FIG.5B

APPARATUS AND METHOD FOR DISPLAYING THUMBNAILS

PRIORITY

This application claims priority under 35 U.S.C. §119(a) to an application filed in the Korean Industrial Property Office on Aug. 27, 2007 and assigned Ser. No. 2007-86100, the contents of which are hereby incorporated by reference

BACKGROUND OF THE INVENTION

1. Field of the Invention

The present invention relates to an apparatus and method for displaying thumbnails. More particularly, the present invention relates to an apparatus and method for displaying thumbnails, which enables a user to easily search for and play thumbnails of moving image clips.

2. Description of the Related Art

As the number of files stored in a mobile communication terminal increases, time and effort required to search for a specified file increases as well. In order to reduce such time and effort, a technique of simultaneously displaying several thumbnail sized images, which refers to a still image, on a screen has been proposed. Also, a technique of simultaneously displaying several still images, which are obtained by capturing an initial frame of a moving image, has been proposed.

The number of thumbnails constituting such a still image list screen, i.e. a thumbnail list screen, is predetermined, and typically four or nine thumbnails are provided to constitute the still image. In this case, the thumbnails are successively displayed on the screen whenever a user shifts an indicator, or all thumbnails are simultaneously displayed on the screen. According to a conventional method for displaying thumbnails, a thumbnail list screen composed of the same number of thumbnails is displayed. However, in the case of a moving image, it is often difficult for a user to perceive intuitively the whole contents of the moving image only through a few of frames displayed on the screen, and it is inconvenient for a user to search for a desired moving image rapidly through the thumbnail list screen. For example, it may be difficult for a user to perceive the contents of a movie through viewing only one scene of the movie. Accordingly, in order to search for a specified moving image, a user should play moving images one by one by shifting an indicator and selecting a corresponding thumbnail.

As described above, in the case of thumbnails of moving image clips, there is no way for a user to confirm the contents of a moving image until an indicator is shifted and a corresponding thumbnail is selected. Also, since the user, in order to search for a specified moving image, should input not only a key for shifting the indicator, but also a playback key for playing the moving image for each thumbnail, the number of key inputs that the user should make increases, so that a lot of time and effort are required in searching for the specified moving image. According to the conventional method, only four or nine thumbnails are typically displayed on the screen. However, if it were possible to display a larger number of thumbnails on one thumbnail list screen, it would provide greater convenience to the user in searching for and selecting a desired still image or moving image. Accordingly, there is a need for a technology that enables a user to confirm thumbnails of moving image clips more easily.

SUMMARY OF THE INVENTION

Accordingly, the present invention has been designed to solve the above and other problems occurring in the prior art, and provides an apparatus and method for displaying thumbnails, which enables a user to easily confirm the thumbnails of moving image clips.

Also, the present invention provides an apparatus and method for displaying thumbnails, which enables a user to easily adjust the number of thumbnails of moving image clips displayed on a screen.

In order to accomplish the above and other objects, there is provided an apparatus for displaying thumbnails, which includes a display unit displaying two or more thumbnails and an indicator indicating any one of the thumbnails, a key input unit outputting a control signal for shifting the indicator if a request to shift the indicator is input from a user, and a control unit playing a moving image corresponding to a thumbnail on which the indicator is positioned, determining a position of the shifted indicator in accordance with the control signal, interrupting a playback of the moving image corresponding to the thumbnail on which the indicator is positioned, and playing a moving image corresponding to a thumbnail on which the shifted indicator is positioned.

In accordance with another aspect of the present invention, there is provided a method for displaying thumbnails, which includes displaying two or more thumbnails and an indicator indicating any one of the thumbnails, playing a moving image corresponding to a thumbnail on which the indicator is positioned judging a position of a shifted indicator if a request to shift the indicator is input from a user, and interrupting a playback of the moving image corresponding to the thumbnail on which the indicator is positioned, and playing the moving image corresponding to a thumbnail on which the shifted indicator is positioned.

BRIEF DESCRIPTION OF THE DRAWINGS

The above and other objects, features and advantages of the present invention will be more apparent from the following detailed description taken in conjunction with the accompanying drawings, in which:

FIGS. 5A and 5B are views illustrating rearrangement of thumbnails according to a preferred embodiment of the present invention.

DETAILED DESCRIPTION OF THE PREFERRED EMBODIMENTS

Preferred embodiments of the present invention will be described in detail hereinafter with reference to the accompanying drawings. In this disclosure, specific matters, such as particular traffic, travel, or weather information services, are exemplified for better understanding of the present invention, but it would be apparent to those of ordinary skill in the art that the present invention can be accomplished without the above specific matters. Also, when a detailed description of the operation or construction of the prior art related to the present invention is considered as making the present invention rather unclear, the detailed description will be omitted for clarity.

The present invention provides a function that enables a user to easily confirm a moving image. For this purpose, an apparatus for displaying thumbnails according to the present invention displays moving image clips in the form of thumbnails, and automatically plays a moving image corresponding to the thumbnail in accordance with a shift of the indicator positioned on the thumbnail. Also, if a key for adjusting the number of thumbnails displayed on a screen is input, the number of thumbnails displayed and the arrangement of the thumbnails are adjusted in accordance with the input of the adjustment key. In this case, a playback of the moving image corresponding to the thumbnail on which the indicator is positioned is maintained without interruption with only the arrangement of the remaining thumbnail is changed. As described above, since the moving image is directly played, a user can easily search for and play a desired moving image, and can adjust the number of thumbnails displayed using a key for adjusting the number of thumbnails displayed on the screen, thereby providing convenience for the user.

Figure 1:
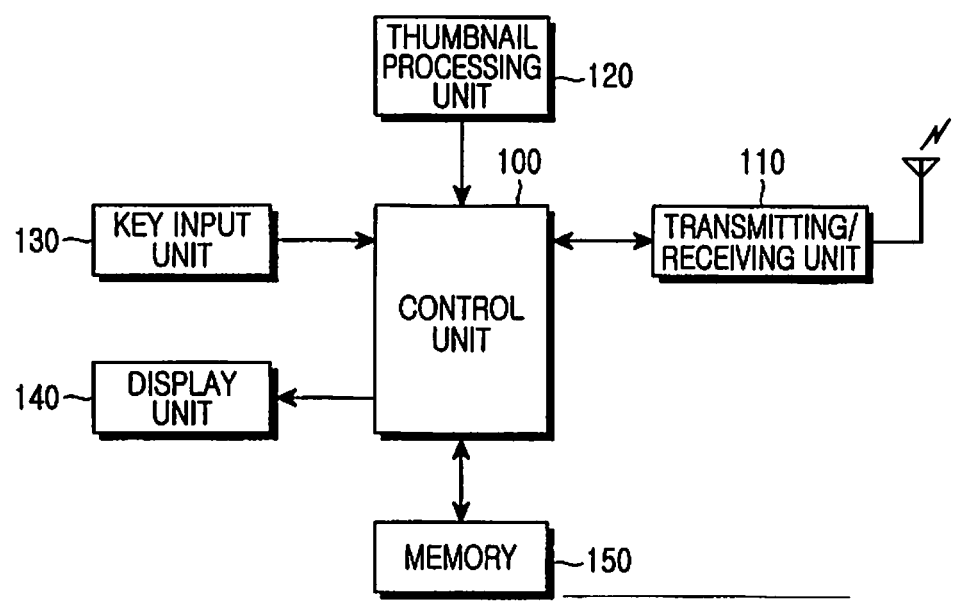
FIG. 1 is a block diagram illustrating the configuration of an apparatus for displaying thumbnails according to a preferred embodiment of the present invention.

Hereinafter, with reference to FIG. 1, the configuration and operation of the apparatus for displaying thumbnails according to a preferred embodiment of the present invention will be described. FIG. 1 is a block diagram illustrating the configuration of an apparatus for displaying thumbnails according to a preferred embodiment of the present invention.

Referring to FIG. 1, the thumbnail display apparatus includes a control unit 100, a transmitting/receiving unit 110, a thumbnail processing unit 120, a key input unit 130, a display unit 140, and a memory 150.

First, the control unit 100 controls the whole operation of the thumbnail display apparatus, and operates to play a moving image corresponding to a thumbnail on which an indicator is positioned in accordance with the shift of the indicator. Even if a key for adjusting the number of thumbnails displayed is input, the control unit 100 operates to play the moving image corresponding to the thumbnail on which the indicator is positioned without interruption.

Specifically, the control unit 100 plays the moving image corresponding to the thumbnail on which the indicator for indicating any one of the thumbnails displayed is positioned. In this case, if the indicator is shifted in accordance with the user's input, the control unit 100 determines the position of the shifted indicator, interrupts the playback of the moving image corresponding to the thumbnail on which the indicator was previously positioned, and starts the playback of the moving image on which the shifted indicator is currently positioned.

The transmitting/receiving unit 110, which is connected to the control unit 100, converts and transmits audio data and control data into a wireless signal, and receives and converts a wireless signal into audio data and control data.

If a key for adjusting the number of thumbnails displayed on the screen is input from the user in a state where the indicator shifted by the user is positioned on any one of the thumbnails, the thumbnail processing unit 120 adjusts the number of thumbnails in accordance with the user's input and rearranges the corresponding thumbnails displayed on the screen.

The key input unit 130 is connected to the control unit 100, and is composed of a plurality of numeric and character keys. In the preferred embodiment of the present invention, the key input unit 130 serves to transfer the control signals for shifting the indicator and adjusting the number of thumbnails to be displayed from the user to the control unit 100.

The display unit 140 may be a display device, such as a Liquid Crystal Display (LCD), and displays two or more thumbnails of moving image clips and the indicator shifted among the thumbnails to indicate any one of the thumbnails. The display unit 140 outputs a preview screen on which thumbnails are displayed, and the preview screen is constructed in the form of tiles that correspond to the respective thumbnails.

In another preferred embodiment of the present invention, the display unit 140 is constructed in the form of a touch screen, and serves to transfer the control signals for shifting the indicator and adjusting the number of thumbnails from the user to the control unit.

The memory 150 is composed of a Read-Only Memory (ROM) for storing a plurality of programs and data, a Random Access Memory (RAM), and the like, and stores a plurality of moving images and thumbnail information of the moving images according to the preferred embodiment of the present invention.

Hereinafter, a method for displaying thumbnails performed by the apparatus for displaying thumbnails according to the present invention will be described with reference to FIG. 2. In the following description, the thumbnail display method according to the present invention will be described with reference to FIGS. 3 to 5B, but is not limited thereto.

Figure 2:
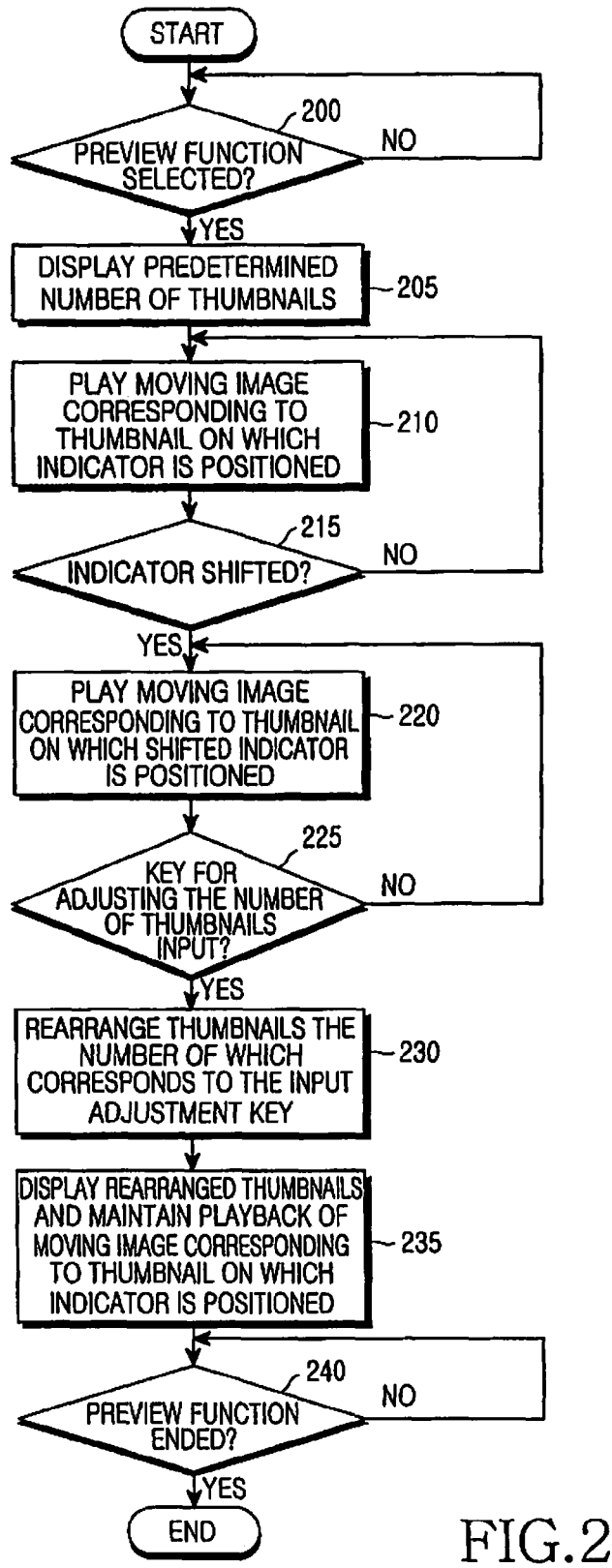
FIG. 2 is a flowchart illustrating a method for displaying thumbnails performed by the apparatus for displaying thumbnails according to a preferred embodiment of the present invention.

Referring to FIG. 2, the thumbnail display apparatus determines whether a preview function for displaying thumbnails of moving image clips is selected in step 200. If it is determined that the preview function is selected, the thumbnail display apparatus displays a predetermined number of thumbnails in step 205. Specifically, the thumbnail display apparatus reads stored thumbnail information, and arranges the thumbnails in a specified order based on the read information. The thumbnails are arranged based on the number of thumbnails displayed, the order of thumbnail generation, the recent playback order, the number of playbacks, and the like.

In the preview screen for displaying the predetermined number of thumbnails, the indicator, which is positioned on one of the thumbnails, is also displayed. Initially, the indicator is positioned on a predetermined thumbnail, which is generally the first thumbnail. The thumbnail, on which the indicator is positioned, may have a size equal to or larger than a size of a neighboring thumbnail. In addition, if there is no input for a predetermined time, the size of the thumbnail may be automatically changed to a predetermined size or a size of the whole screen.

As described above, the thumbnail display apparatus proceeds to step 210 in a state where the predetermined number of thumbnails are displayed, and plays the moving image corresponding to the thumbnail on which the indicator is positioned. Then, the thumbnail apparatus determines whether the indicator is shifted in accordance with a user's input. Here, the indicator is shifted between the thumbnails, and the shift of the indicator may be performed by a pointing device, such as a direction key, an optical mouse, and touch of the touch screen. The shift of the indicator by the direction key is performed step by step in upward, downward, left and right directions; while in the case of the pointing device, the shift of the indicator is not limited to the step-by-step shift.

Then, if it is determined that the indicator is shifted, the thumbnail display apparatus interrupts the playback of the current moving image, and starts to play the moving image corresponding to the thumbnail on which a currently shifted indicator is positioned. In other words, the moving image corresponding to the thumbnail on which the shifted indicator is positioned is automatically played even if the user does not make any selection after shifting the indicator. In the case where the indicator is positioned on any one of the thumbnails, the moving image may be immediately played, or after a predetermined waiting time. After the completion of the playback, the moving image may be replayed.

Also, if the indicator is shifted, another indicator may be positioned on the thumbnail of which the playback is interrupted so that the user can perceive that the playback of the moving image is interrupted. For example, when another indicator, which is different from the shifted indicator, is additionally displayed, a method for making the shading color of another indicator different from that of the shifted indicator may be used. In addition, the length of the moving image, which is varied as the moving image is played, may be indicated using a progress bar. For example, it may be indicated to the user that another moving image is played using a color different from that of the moving image portion of which the playback is interrupted.

Figure 3:
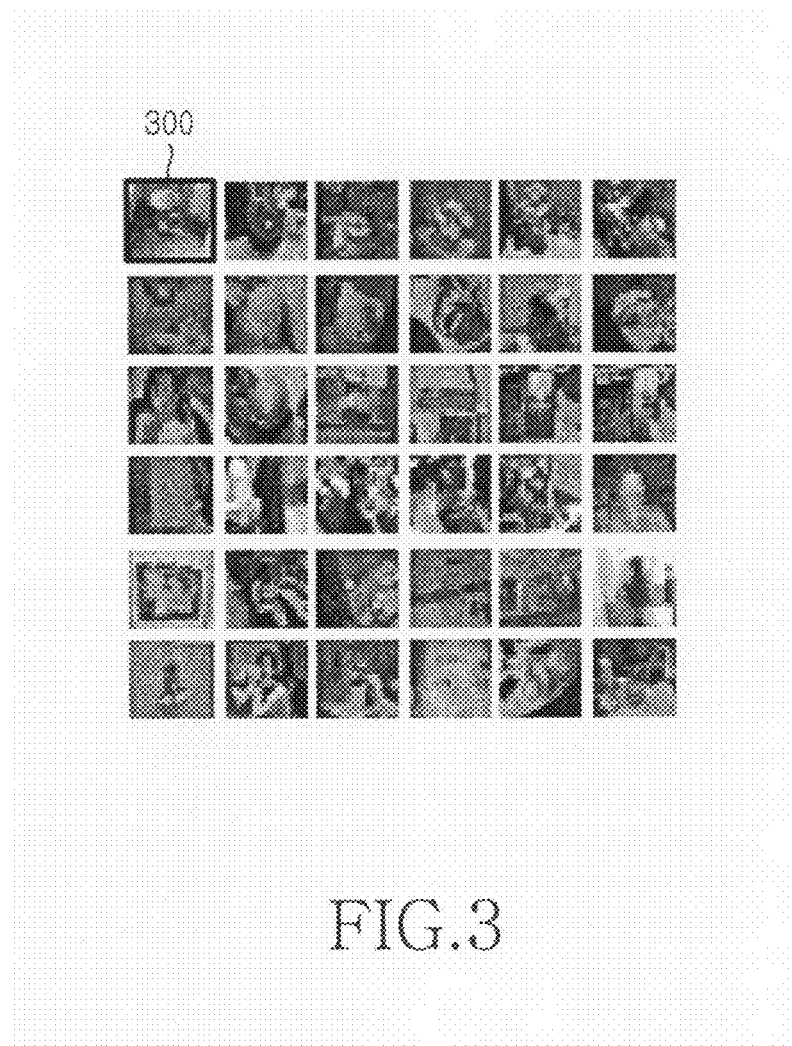
FIG. 3 is an exemplary view illustrating a plurality of thumbnails displayed on a screen according to a preferred embodiment of the present invention.

FIG. 3 is an exemplary view illustrating a plurality of thumbnails displayed on a screen according to a preferred embodiment of the present invention.

Referring to FIG. 3, it is shown that representative still cuts of a plurality of moving images are displayed as respective thumbnails in a preview screen; and among them, a moving image corresponding to the thumbnail, on which the indicator 300 is positioned, is played. In FIG. 3, it is shown that the border of the thumbnail, on which the indicator 300 is positioned, is highlighted when the indicator is shifted. However, when the indicator is shifted, the corresponding thumbnail may be indicated as a shaded part, or the size of the thumbnail displayed may be enlarged.

In playing the moving image corresponding to the thumbnail, the moving image played may be kept at the current size, or may be enlarged to a predetermined size in consideration of the screen layout. Also, when the moving image is played, a progress bar for visually indicating the whole length of the corresponding moving image may be displayed with a specified color given to the length of the played portion of the moving image that is varied as the moving image is played. Accordingly, the user can grasp, at a glance, the whole length of the moving image and the length of the played portion of the moving image.

In the preferred embodiment of the present invention as described above, the user can see the moving image directly played after the indicator is shifted to the corresponding thumbnail, without inputting a key for selecting the thumbnail. Accordingly, only by shifting the indicator to a desired thumbnail, the user can easily search for and play the moving image.

Also, in the present invention, a function capable of adjusting the number of thumbnails displayed on the screen in accordance with the user's need is provided. The number of thumbnails to be displayed is adjusted by inputting a key for adjusting the number of thumbnails, which may be a volume up/down key and so on. Accordingly, the thumbnail display apparatus determines whether the adjustment key is input in step 225 in a state where the moving image corresponding to any one of the thumbnails is played.

If it is determined that the adjustment key is input, the thumbnail display apparatus rearranges the thumbnails on the screen, the number of which has been adjusted in accordance with the input adjustment key in step 230. Specifically, the thumbnail display apparatus increases or decreases the number of thumbnails displayed on the display unit 140 in accordance with the input of the thumbnail number adjustment key, and rearranges the adjusted thumbnails on the screen.

In the preferred embodiment of the present invention, for the user's convenience in operation in a state where the user holds the thumbnail display apparatus in one hand, the volume up/down key may be used as the thumbnail number adjustment key. Then, the thumbnail display apparatus displays the thumbnails rearranged in step 235 while the playback of the moving image corresponding to the thumbnail, on which the indicator is positioned, is maintained, until the preview function is ended by the user in step 240. As described above, unless the indicator is shifted, even in a state where the number of thumbnails is changed, the playback of the moving image is maintained without interruption.

FIGS. 4A to 4F are exemplary views illustrating arrangement structures of thumbnails according to a preferred embodiment of the present invention.

Figure 4F:
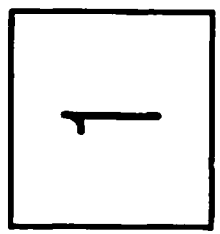
FIGS. 4A to 4F are exemplary views illustrating arrangement structures of thumbnails according to a preferred embodiment of the present invention.
Figure 4E:
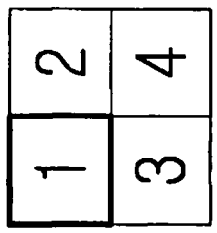
Figure 4D:
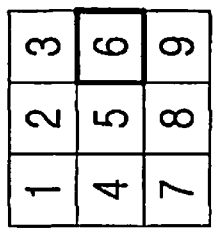
Figure 4C:
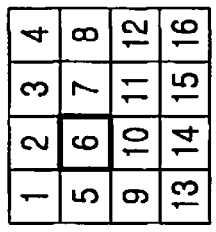
Figure 4B:
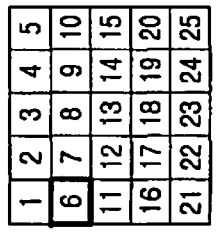
Figure 4A:
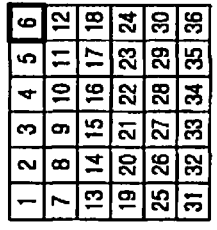

FIGS. 4A to 4F show the thumbnails arranged in the form of 6×6, 5×5, 4×4, 3×3, 2×2, and 1×1 tiles, respectively. In accordance with the user's input of the thumbnail number adjustment key, the number of thumbnails to be displayed is decreased or increased in a manner as shown in FIG. 4A to FIG. 4F. For example, if the user presses the volume up/down key once in order to adjust the number of thumbnails displayed in a state as shown in FIG. 4A, the number of thumbnails displayed is decreased, and 5×5 thumbnails are displayed as shown in FIG. 4B. If the user presses the volume up/down key in succession, the number of thumbnails displayed is gradually decreased, and the moving image corresponding to the thumbnail as shown in FIG. 4F is finally played. As described above, in accordance with the number of inputs of the thumbnail number adjustment key, the number of thumbnails displayed is changed in succession with the size of the displayed thumbnail enlarged or reduced. Unless the indicator is shifted in this state, the corresponding moving image is displayed without interruption.

In accordance with the input of the thumbnail number adjustment key, the thumbnails are rearranged as described above. In this case, the thumbnail on which the indicator is positioned may be arranged as follows. The thumbnail arrangement method according to the preferred embodiment of the present invention may be briefly classified into a method for rearranging all thumbnails irrespective of the position of the thumbnail on which the indicator is positioned and a method for rearranging the remaining thumbnails around the thumbnail on which the indicator is positioned.

First, the method for rearranging all thumbnails will be described. For example, if the number of thumbnails displayed is decreased in a state where the indicator is positioned on the sixth thumbnail as shown in FIG. 4A, the decreased thumbnails are rearranged as shown in FIG. 4B, and the sixth thumbnail is shifted to the first position in the second row as shown in FIG. 4B. In the same manner, if the number of thumbnails is decreased once more, the sixth thumbnail is shifted to the second position in the second row as shown in FIG. 4C. In the case of rearranging the thumbnails as described above, the number of thumbnails displayed is increased or decreased within a predetermined number, and the increased or decreased thumbnails are rearranged. In this case, as the number of thumbnails displayed is adjusted, the position and the size of the thumbnail on which the indicator is positioned are changed, but the playback of the moving image corresponding to the thumbnail is maintained.

Figures 5A, 5B:
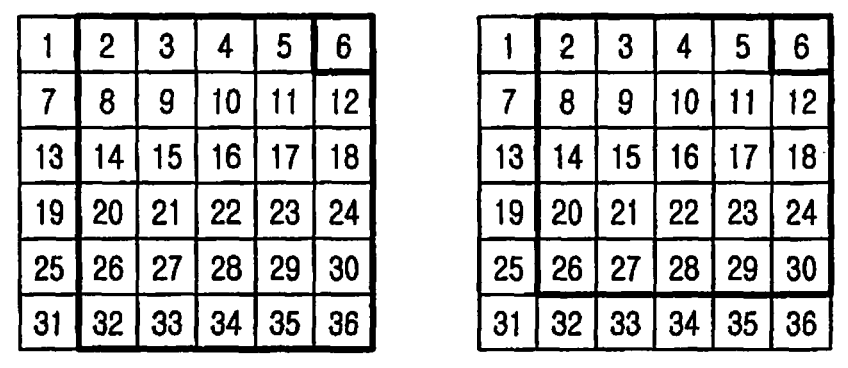

With reference to FIGS. 5A and 5B, the method for rearranging the remaining thumbnails around the thumbnail on which the indicator is positioned will be described. In FIG. 5A, it is shown that, in the case of inputting the adjustment key for decreasing the number of thumbnails displayed, 6×6 thumbnails are reduced to 6×5 thumbnails. Although FIG. 5A shows the method for vertically reducing the number of thumbnails displayed, it is also possible to horizontally and/or vertically decrease or increase the number of thumbnails line by line or column by column around the thumbnail, on which the indicator is positioned, on the preview screen in the form of tiles. FIG. 5B shows a case where 6×6 thumbnails are reduced to 5×5 thumbnails.

FIGS. 5A and 5B show a case where the indicator is positioned on the sixth thumbnail. In this case, only the surrounding thumbnails are rearranged around the thumbnail on which the indicator is positioned, and the moving image corresponding to the sixth thumbnail, on which the indicator is positioned, is played without interruption.

On the other hand, although it is shown that only one moving image corresponding to the thumbnail on which the indicator is positioned is played, the present invention can also be applied to a case where two or more moving images are played. For example, if more than one thumbnail is checked using a check box and so on, the moving images corresponding to the checked thumbnails may be played in succession. In this case, the playback order may be designated in different ways, for example, from left to right, from the upside to the downside, in random order, and the like.

As described above, according to the present invention, the user can easily adjust the number of thumbnails displayed on one thumbnail list screen. In addition, since the corresponding thumbnail is automatically played even when the user only shifts the indicator, a separate key input for playback of the moving image is not required, and thus the user's convenience in searching for and selecting a desired still image/moving image can be improved.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for displaying thumbnails, the apparatus comprising:
   a display configured to display a plurality of thumbnails; and
   a controller configured to:
   automatically play a first moving image corresponding to a first thumbnail from among the plurality of thumbnails which is indicated by an indicator,
   determine whether a second thumbnail from among the plurality of thumbnails is indicated by the indicator, and
   when the second thumbnail from among the plurality of thumbnails is indicated by the indicator, automatically interrupt a playback of the first moving image, automatically play a second moving image corresponding to the second thumbnail, and automatically display a progress bar representing a whole length of the first moving image and a length of a played portion of the first moving image,
   wherein the display is configured to display the plurality of thumbnails in a first size, and the controller is further configured to display the plurality of thumbnails in a second size different from the first size in response to a first press of a volume key.

2. The apparatus as claimed in claim 1, wherein the controller is further configured to automatically play the second moving image corresponding to the second thumbnail after a predetermined waiting time.

3. The apparatus as claimed in claim 1, wherein the controller is further configured to enlarge the second moving image corresponding to the second thumbnail to a predetermined size.

4. The apparatus as claimed in claim 1, wherein the controller is further configured to automatically play the second moving image corresponding to the second thumbnail, if no signal is input from a key input unit for a predetermined time.

5. The apparatus as claimed in claim 1, wherein the second size is greater than the first size.

6. The apparatus as claimed in claim 1, wherein the controller is further configured to display the plurality of thumbnails in a third size different from the first size and second size in response to a second press of the volume key following the first press of the volume key.

7. The apparatus as claimed in claim 6, wherein the second size is greater than the first size, and the third size is greater than the second size.

8. A method for displaying thumbnails, the method comprising:
   displaying a plurality of thumbnails;
   automatically playing a first moving image corresponding to a first thumbnail which is indicated by an indicator;
   determining whether a second thumbnail from among the plurality of thumbnails is indicated by the indicator;
   when the second thumbnail from among the plurality of thumbnails is indicated by the indicator, automatically interrupting a playback of the first moving image, automatically playing a second moving image corresponding to the second thumbnail, and automatically displaying a progress bar representing a whole length of the first moving image and a length of a played portion of the first moving image; and
   displaying the plurality of thumbnails in a first size, and displaying the plurality of thumbnails in a second size different from the first size in response to a first press of a volume key.

9. The method as claimed in claim 8, wherein the step of automatically playing the second moving image comprises automatically playing the second moving image when there is no key input for a predetermined time.

10. The method as claimed in claim 8, wherein the step of automatically playing the second moving image comprises automatically playing the second moving image after a predetermined waiting time.

11. The method as claimed in claim 8, wherein the step of automatically playing the second moving image comprises automatically enlarging the second moving image to a predetermined size and automatically playing the enlarged second moving image.

12. The method as claimed in claim 8, wherein the second size is greater than the first size.

13. The method as claimed in claim 8, wherein the plurality of thumbnails are displayed in a third size different from the first size and second size in response to a second press of the volume key following the first press of the volume key.

14. The method as claimed in claim 13, wherein the second size is greater than the first size, and the third size is greater than the second size.

\* \* \* \* \*